A. J. BAUM.
SEAT SECURING DEVICE FOR CHAIRS.
APPLICATION FILED JULY 8, 1914.

1,162,281.

Patented Nov. 30, 1915.

WITNESSES
Wm. Dzell.
Clair Kaufmann.

INVENTOR,
Albert J. Baum,
BY
John Luward,
ATTORNEY.

UNITED STATES PATENT OFFICE.

ALBERT J. BAUM, OF NEW YORK, N. Y., ASSIGNOR TO ALBERT WANNER, JR., OF NEW YORK, N. Y.

SEAT-SECURING DEVICE FOR CHAIRS.

1,162,281.   Specification of Letters Patent.   Patented Nov. 30, 1915.

Application filed July 8, 1914. Serial No. 849,651.

*To all whom it may concern:*

Be it known that I, ALBERT J. BAUM, a citizen of the United States, residing at New York city, in the county of New York and State of New York, have invented certain new and useful Improvements in Seat-Securing Devices for Chairs, of which the following is a specification.

This invention relates to means for securing padded or other auxiliary seats upon the seats of cane-seated chairs or other seating appliances, and its object is to provide a securing means of this kind that will not require any adjunctive device to attach it to the chair seat ring or frame, and yet will securely fasten the auxiliary seat in place, and that may be made in a facile and expeditious manner to extend through any hole in the cane seat that happens to be most convenient in positioning the auxiliary seat properly on the permanent seat frame.

Figure 1:
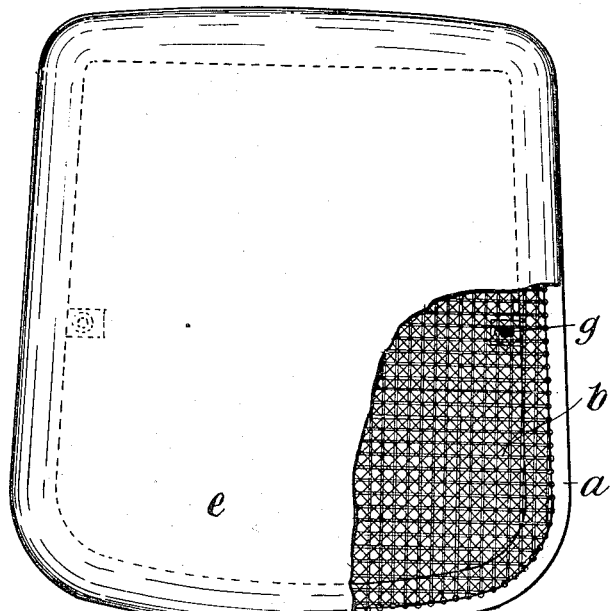
Figures 2, 3:
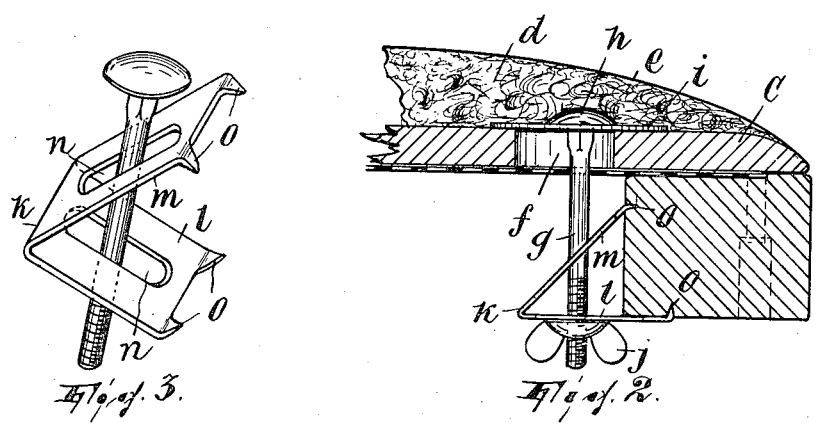
Figure 4:
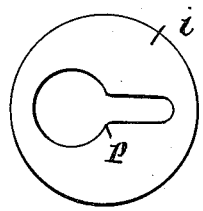

Referring to the accompanying drawing, wherein the invention is fully illustrated, Figure 1 is a plan of a permanent seat frame and an auxiliary seat secured together in accordance with this invention; Fig. 2 is a fragmentary sectional detail of Fig. 1; Fig. 3 is a perspective view of the bolt and clip of the improved securing means; and, Fig. 4 is a plan of the preferred form of disk or washer used.

In said drawing, *a* is the ring or open frame of the permanent seat and *b* the apertured or reticulated caning thereof.

*c* is the base-plate or bottom, *d* the filling and *e* the leather, fabric or other suitable cover of a padded or upholstered auxiliary seat which is to be superimposed and secured upon the permanent seat. Said base-plate is formed with suitably placed holes *f* through which extend the shanks *g* (smaller in diameter than said holes) of bolts whose heads *h* underlie the filling *d* and are supported by the disks or washers *i* which they penetrate and which are suitably larger in diameter than said holes. For a purpose to be explained, the openings in the washers are preferably key-hole slots (Fig. 4). The threaded lower ends of the bolts, which project downwardly a suitable distance from the auxiliary seat, are provided with the wing nuts *j*.

As anchorages for the lower ends of the bolts I provide the metallic clips in the form of angle-pieces *k*. Each of these consists of a plate or strip bent once transversely at or near its middle so that the legs *l* and *m* thereof stand at a suitable acute angle with reference to each other. The legs of the angle-piece have the opposite longitudinal slots *n* and are provided at their ends with the inwardly projecting spurs or tangs *o*.

The auxiliary seat is secured upon the permanent seat by the improved securing means as follows: Having properly positioned the auxiliary seat on the permanent seat, leaving the bolts extending through holes in the caning, the angle-pieces are placed upon the shanks of the bolts (which penetrate the slots thereof) so that ultimately their legs *l* may be made to lie flat against the under side of the seat frame and the ends of their legs *m* made to bear against the inner side of said frame. The nuts *j* are then fitted to the bolts and screwed up against the angle-pieces, which are prevented from slipping, however great the pressure thus exerted, by their spurs being forced into the wood of the seat frame. In this way, the auxiliary seat may be attached to the permanent seat in an exceedingly secure condition.

It will be observed that my invention makes unnecessary any mutilation of the permanent seat frame whatever; that the fastening means is of such character that it may be placed at any position in the circumference of the seat frame; and that the auxiliary seat may be applied to or removed from the permanent seat frame with the greatest facility.

By forming the holes *f* somewhat larger in diameter than the shanks of the bolts the latter may be shifted in any lateral direction so as to center any bolt directly over the hole in the caning that happens to be most accessible once the position of the auxiliary seat on the permanent seat is determined; the slots *n* in the clip allow adjustment of the bolt therein radially of the frame *a*.

The washers may be placed in between the base-plate and the filling of the auxiliary seat in making up the latter. In the preferred construction, in order to avoid assembling the bolts with the parts of the auxiliary seat at the time it is made up, key-hole slots *p* are used in the washers, permitting the bolts to be assembled with the washers at the time they are to go into service by inserting their heads through the enlarged ends of the slots and then shifting the bolts laterally into the restricted portions of said slots.

Having thus fully described my invention, what I claim as new and desire to secure by Letters Patent is:—

1. In combination, an open seat frame, a seat above the frame, a clip having legs arranged at an acute angle to each other and one bearing substantially flatwise against the under side of the frame and the other bearing endwise against the inner lateral face of the frame, said clip projecting inwardly beyond said inner face, and means to connect the seat with the clip engaged with the latter in its projecting portion.

2. In combination, an open seat frame, a seat above the frame, a clip having two legs, one bearing against and having a non-slipping engagement with the under side of the frame and the other bearing against the inner lateral face of the frame, said clip projecting inwardly beyond said inner face, and means to connect the seat with the clip engaged with the latter in its projecting portion.

3. In combination, an open seat frame, a seat above the frame, a clip having two legs, one bearing against and having a tang engaged with the under side of the frame and the other bearing against the inner lateral face of the frame, said clip projecting inwardly beyond said inner face, and means to connect the seat with the clip engaged with the latter in its projecting portion.

4. In combination, an open seat frame, a seat above the frame, a clip consisting of a metallic strip bent to form two legs, one bearing against and having a tang engaged with the under side of the frame and the other bearing against the inner lateral face of the frame, said clip projecting beyond said inner face, and a bolt and nut device connecting the seat with the clip, the shank of the bolt penetrating the clip.

5. In combination, an open seat frame, a seat above the same, and means to secure the seat to the frame including a radially slotted inwardly projecting clip supported by the frame below the seat, and a device to connect the seat and clip penetrating the slot of the latter.

6. In combination, a caned seat having a frame, another seat resting on the caned seat, and means to secure the second seat to the first seat including an inwardly projecting clip bearing against said frame and clamping means connecting said clip and the second seat, said clamping means penetrating a hole in the caning of the caned seat and the second seat having a relatively enlarged opening penetrated by said clamping means.

In testimony whereof I affix my signature in presence of two witnesses.

ALBERT J. BAUM.

Witnesses:
CHAS. O. WALTER,
CHAS. POPP.